United States Patent
Powell

(10) Patent No.: US 6,568,293 B1
(45) Date of Patent: May 27, 2003

(54) LINEAR DRIVE

(75) Inventor: Simon Powell, Baldock (GB)

(73) Assignee: PBT (IP) Limited (GB)

( * ) Notice: Subject to any disclaimer, the term of this patent is extended or adjusted under 35 U.S.C. 154(b) by 0 days.

(21) Appl. No.: 09/701,331

(22) PCT Filed: May 27, 1999

(86) PCT No.: PCT/GB99/01678

§ 371 (c)(1), (2), (4) Date: Dec. 28, 2000

(87) PCT Pub. No.: WO99/61818

PCT Pub. Date: Dec. 2, 1999

(30) Foreign Application Priority Data

May 27, 1998 (GB) .............................................. 9811397

(51) Int. Cl.[7] .............................................. F16H 25/18
(52) U.S. Cl. .................................................... 74/424.73
(58) Field of Search ...................................... 74/424.73

(56) References Cited

U.S. PATENT DOCUMENTS

| | | | | |
|---|---|---|---|---|
| 402,674 | A | * 5/1889 | Judson | ............................ 74/25 |
| 2,382,105 | A | * 8/1945 | Sarver | ............................ 74/25 |
| 3,425,284 | A | 2/1969 | Shelton | |
| 3,599,498 | A | * 8/1971 | Misenti | ....................... 376/228 |
| 3,717,042 | A | 2/1973 | Zaruba | |

OTHER PUBLICATIONS

Patent Abstracts of Japan, vol. 12, No. 374 (M–749), Oct. 16, 1988, and Japanese Patent Publication No. 63–125855 A, to Sumitomo Heavy Ind. Ltd., May 30, 1988.
Patent Abstracts of Japan, vol. 14, No. 274 (P–1061), Jun. 13, 1990, and Japanese Patent Publication No. 2–80907 A, to Mitsutoyo Corp., Mar. 22, 1990.
Patent Abstracts of Japan, vol. 14, No. 274 (P–1061), Jun. 13, 1990, and Japanese Patent Publication No. 2–80908 A, to Mitsutoyo Corp., Mar. 22, 1990.

* cited by examiner

Primary Examiner—David Fenstermacher
(74) Attorney, Agent, or Firm—Rankin, Hill, Porter & Clark, LLP

(57) ABSTRACT

An apparatus for producing linear motion from rotary motion is disclosed comprising a drive rod (10) of circular cross section which is arranged to be rotated at a constant speed in the same direction. A carriage (11) which is arranged to be mounted on the rod for axial movement along the length thereof is provided with at least one roller member (12a, 12b) arranged to engage the rod at an angle to the axis of rotation of the rod. The rotary motion of the red then causes the roller member to rotate, thereby generating an axial rector component in a direction along the rod, thus causing the carriage to move in a linear direction along the rod.

20 Claims, 2 Drawing Sheets

LINEAR DRIVE

TECHNICAL FIELD

The present invention relates to apparatus for producing linear motion, and more particularly to producing linear motion from rotary motion.

BACKGROUND ART

Linear motion can be produced using a large number of different mechanisms, and a wide range of such mechanisms will be apparent to those skilled in the art. Furthermore, a wide range of mechanisms which more specifically convert a rotary motion into a linear motion will also be known, and have found application in many different technical fields.

SUMMARY OF THE INVENTION

It is an object of the present invention that linear motion needs to be created with very simply controlled apparatus without requiring complicated gearing or switching systems. The linear motion is to be produced from rotary motion in a single direction.

In order to meet the above object, the present invention provides for an elongate drive rod of circular cross-section which is arranged to be rotated at a constant speed in the same direction. A carriage which is arranged to be mounted on the rod for axial movement along the length of the rod is provided with at least one roller member disposed with its axis of rotation at an angle to the perpendicular to the axis of rotation of the rod, and arranged to be pressed into contact with the surface of the rod by an actuator. The rotary motion of the rod causes the roller member to rotate about its axis, the direction of rotation causing a component vector to arise in an axial direction along the rod, thereby moving the carriage and roller along the elongate rod.

According to the present invention, there is provided an apparatus for producing linear motion comprising:

an elongate rod of circular cross-section arranged to be continuously rotated in a first direction about an elongate axis; and a carriage arranged to be mounted on the rod so as to permit axial movement of the carriage along the length of the rod;

wherein the carriage comprises:

at least one first roller member arranged to contact the rod such that an axis of rotation of said roller member is at a first angle to the axis of rotation of the rod; and at least one first actuator means for pressing the first roller member against the rod to cause rotation of the roller member;

wherein the rotation of the roller member generates at least one axial vector in a first axial direction along said rod whereby to cause axial movement of the carriage along the rod in said first axial direction.

The carriage may be further provided with at least one other roller member arranged to contact the rod at a second angle to the axis of rotation of the rod. In this case, the other roller member is provided with its own actuator means arranged to press the other roller member against the rod. The second angle at which the other roller member is disposed with respect to the axis of rotation of the rod is such so as to generate a second vector component in a second axial direction opposite to the first axial direction, thus moving the carriage in the opposite direction along the rod.

The second angle at which the other roller member is disposed at with respect to the angle of rotation of the rod may be identical in magnitude but opposite in direction to the first angle, in which case the speed of movement in each direction along the rod when the respective first or other roller is engaged with the rod will be identical. Alternatively, the second angle may be different in magnitude to the first angle, in which case the carriage will move at a different speed in the second axial direction when the other roller is engaged with the rod to the speed of movement in the first axial direction when the first roller is engaged with the rod.

Preferably, the operations of the first and the other actuation means are mutually exclusive, whereby only one or other of the roller members may be in contact with the rod at any one time.

Furthermore, the roller members need not each contact the same side of the rod, but may instead be disposed at any convenient location around the rod. In the case where the first roller is disposed on the opposite side of the rod to the other roller, then when the apparatus is viewed directly from above the first roller and the other roller may appear to be arranged at substantially the same angle to the axis of rotation of the rod. This is due to the actual contact surface of the rod effectively moving in opposite directions on each opposite side, thus generating axial vectors along the rod in opposite directions for the same roller angle.

It is advantageous if the means for pressing the rotatable members against the rod is in the form of a piezo electric device so that the linear motion can be electrically controlled.

In addition, more than one roller member may be provided arranged to generate movement in each direction. In this case, each roller member arranged to generate movement in the same direction may be disposed at different angles to each other, so that the speed of linear movement of the carriage in the direction may be varied by selection of the appropriate roller. Furthermore, where this is the case, the actuator means for each roller can be controlled independently from each other.

BRIEF DESCRIPTION OF THE ACCOMPANYING DRAWINGS

In order that the present invention be more readily understood, an embodiment thereof will now be described by way of example with reference to the accompanying drawings, in which.

DESCRIPTION OF THE PREFERRED EMBODIMENT

The preferred embodiment of the present invention is arranged to produce linear motion in a controllable fashion from a shaft which is arranged to rotate continuously in one direction.

Figure 1:
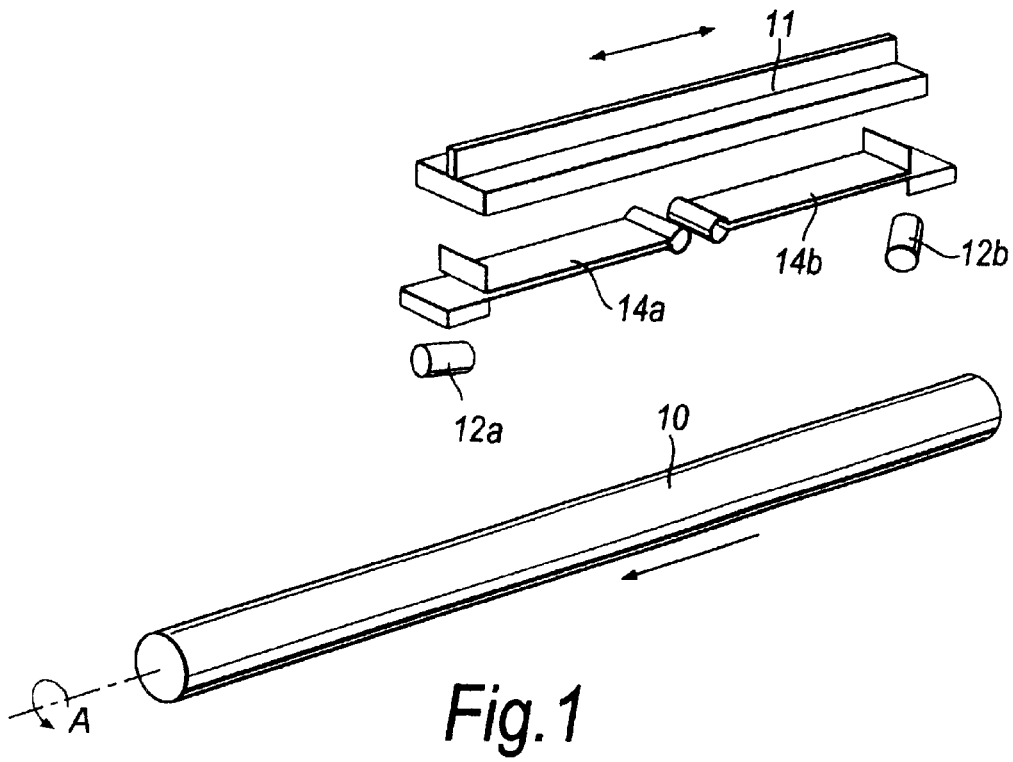
FIG. 1 shows an exploded perspective view of a apparatus according to the present invention.

Referring firstly to FIG. 1, this shows a rotatable shaft (10) which is arranged to rotate continuously in one direction as indicated by the arrow A. Mounted on the shaft (10) is a carriage (11) which in this embodiment is shown as being elongate in the direction of the shaft (10) and is provided with rotatable members (12a, 12b) at either end of the carriage. The rotatable members (12a, 12b) are coupled to the carriage (11) by means of actuators (14a, 14b) which, when operated, are arranged to press one or other of the rotatable members against the shaft (10).

Each rotatable member is set at an angle to the perpendicular of the shaft (10) so that an axial vector is created when a rotatable member (12) engages the shaft as a result of the operation of the respective actuator means for that rotatable member. The angle of the or each rotatable member with respect to the perpendicular of the shaft is chosen having regard to the desired direction of movement of the carriage (11) and the relative speed of linear motion as compared with the rotational speed of the shaft. It will be appreciated that this latter factor is affected by the magnitude of the vector created due to the angle of the rotatable member. It will be further appreciated that each rotatable member rotates in the same direction with respect to its own axis of rotation as every other rotatable member, regardless of the angle at which each rotatable member is disposed with respect to the shaft. Thus, for example, if the shaft is arranged to rotate anticlockwise, then all the rotatable members will rotate clockwise about their own respective axes, when viewed from the same respective end. It is the axial component vector generated as a result of the angle which causes the movement of the carriage in one direction or the other, and not the direction of rotation of the particular rotatable member.

Figure 2:
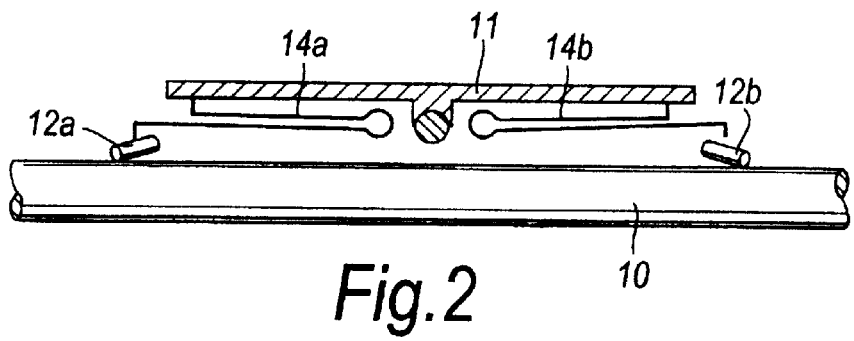
FIG. 2 shows a diagrammatic side view of the apparatus shown in FIG. 1.

As shown in FIGS. 1 and 2, in a first arrangement the rotatable members (12a and 12b) are set at inverse angles to each other so that one member generates an axial vector along the shaft in one direction when pressed against the shaft, and the other member generates a second axial vector along the shaft in an opposite direction. The mechanism coupling them to the carriage (11) is in the form of a piezo electric device which will be described in more detail later with reference to FIG. 3. When one or other of the piezo electric devices (14a or 14b) is energised, its associated rotatable member (12a or 12b) is pressed against the rotating shaft (10) to drive the carriage (11) in one or other axial direction along the shaft (10) without stopping the shaft.

Figure 4:
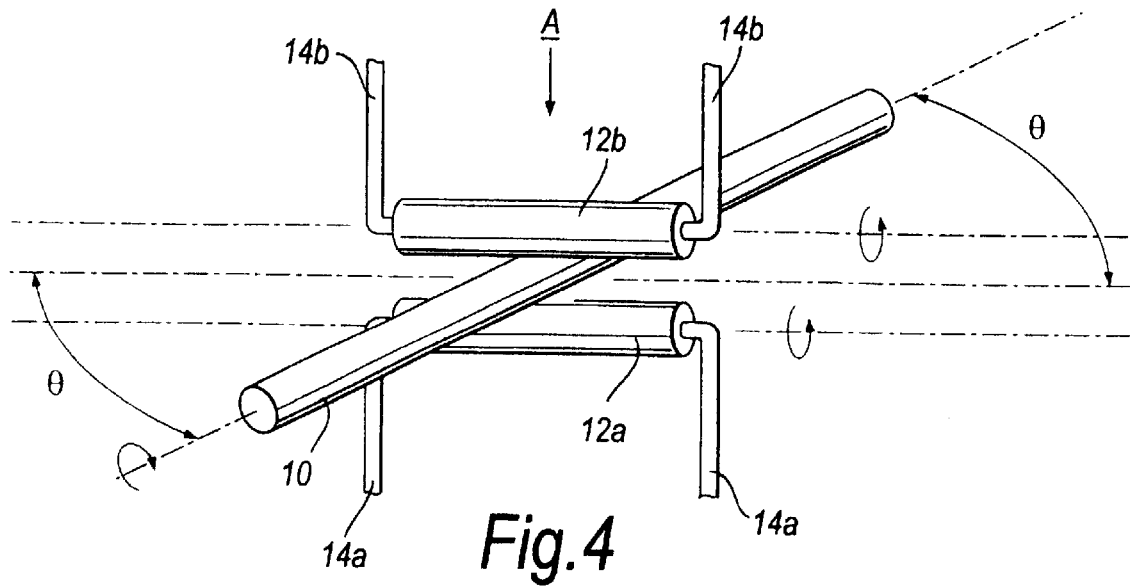
FIG. 4 shows a perspective view of an alternative arrangement of the apparatus of FIG. 1, wherein the rotatable members are disposed on opposite sides of the shaft.
Figure 5:
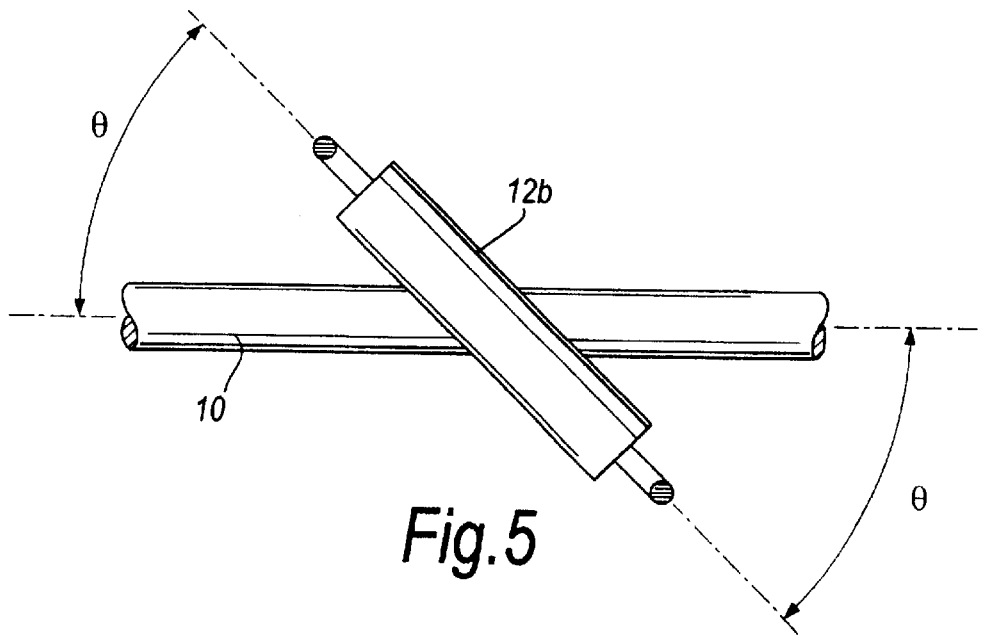
FIG. 5 shows a plan view of the arrangement of FIG. 4 looking in the direction of the arrow A.

It will be appreciated that various modifications can be made to the above described arrangement. For example, although the rotatable members (12a and 12b) are shown in FIGS. 1 and 2 as being disposed at opposite ends of the carriage (11) and in line with each other, it would be possible to shorten the length of carriage (11) by disposing the rotatable member (12b) at the same end as the rotatable member (12a) but on the opposite side of the shaft to the rotatable member (12b) so that in effect the carriage (11) surrounds the shaft (10) which rotates within its confines. Such an arrangement as this is shown in FIGS. 4 and 5. In this case, as the surface of the shaft (10) is effectively moving in opposite directions at each opposite side of the shaft where the rotatable members respectively engage, the rotatable members (12a) and (12b) may each be disposed at the same angle 74 to the axis of rotation of the shaft, when viewed from either directly above or below at a perpendicular to the contact surface of either of the rollers, as shown in FIG. 5. As before, each of the rotatable members will rotate in the same direction with respect to their own axes, but as they are on opposite sides of the shaft (10) axial component vectors in opposite directions will be produced for each rotatable member, thus allowing the carriage to be moved in either direction along the shaft.

It is also possible to increase the number of rotatable members for producing motion in any one direction. In this case it is most easy to consider a number of rotatable members (12a) disposed around the circumference at, for example, 120° intervals. This use of multiple rotatable members could equally be used with the short drive system described above by alternating rotatable members (12a and 12b) around the circumference of the rod.

Where multiple rotatable members are used for producing linear motion in one direction, each of the members can be disposed at a different angle to the axis of rotation of the shaft. This has the advantage that by selecting individual rotatable members of the group to press against the shaft, the carriage may be moved along the shaft in the same direction but at different linear speeds for the same rotational speed of the shaft. The respective actuator means for each rotatable member must in this case be independently controllable from each other to allow different rotatable members to be selected to press against the shaft.

In addition to the above, where a plurality of rotatable members are employed, it is of course possible to have each of the members set at the same angle, and to engage all of the members with the shaft at the same time. This has the advantage that a greater linear driving force in the axial direction will be generated, resulting in a more positive linear drive.

The above description has concentrated so far on the arrangement of the rotatable members with respect to the shaft. The following description will now describe in more detail the actuator means used to engage each roller with the shaft.

Figure 3:
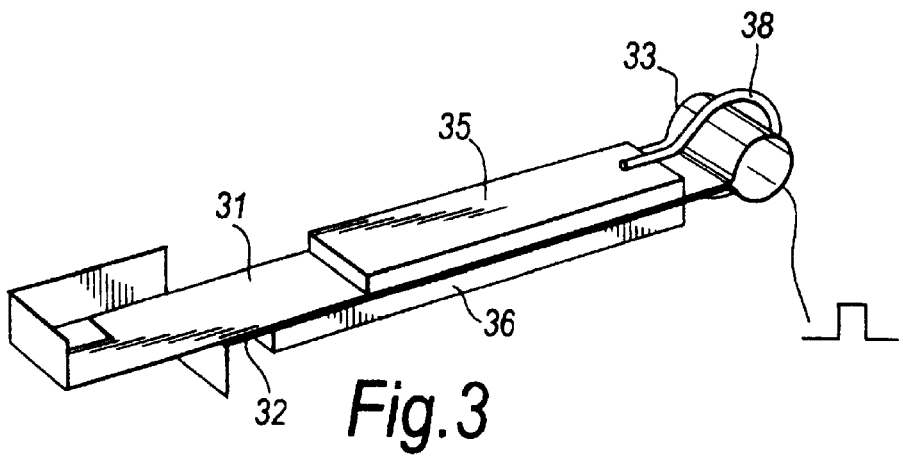
FIG. 3 shows a perspective view of a piezo electric actuator suitable for use with the apparatus shown in FIG. 1.

FIG. 3 shows one form of a piezo electric actuator which could be used for pressing a rotatable member against the rotatable shaft (10). The actuator comprises a generally flat hairpin-like resilient device usually formed of a spring steel or the like. The legs (31 and 32) are arranged to lie substantially parallel with each other in an engagement along a substantial length of the legs and this in turn means that there is a rigid connecting portion (33) joining the two legs together. The non-engaging surfaces of the legs (31 and 32) are each provided with piezo electric layers (35 and 36) respectively. The piezo electric layers are poled the same way and are electrically linked by a conductor (38). The free end of one of the legs (31,32) is fixed and when the piezo electric layers (35 and 36) are energised the free end of the other leg is deflected away from the fixed leg. Removal of the energisation from the device results in the legs resuming their parallel and touching relationship.

As an alternative to the above arrangement, the two legs need not necessarily be fixed to the rigid connecting portion so that they lie in mutual engagement, nor need they be parallel to each other. Instead, the legs may be fixed so that opposite surfaces of each leg are merely facing each other, and may be angled away from at each other at any convenient angle. Such an arrangement has a disadvantage in that it is structurally weaker when the piezo-ceramic layers are not energised, but may provide greater flexibility in incorporating the actuator into mechanisms as required.

Whichever of the above arrangements is chosen, it will thus be apparent that by using a piezo electric actuator as shown in FIG. 3 for the actuators (14a and 14b) shown in FIGS. 1 and 2, a very simple electrically controlled drive mechanism can be produced which allows for close control of which, if any, rotatable member is to be engaged with the shaft at any one time.

Other forms of piezo electric actuator can be utilized depending on the exact application which is contemplated. For example, an actuator such as disclosed in our International Application PCT/GB98/0670 could also be utilized. Moreover, other forms of actuation means may also be suitable for use with the present invention, such as, for example, electric solenoids, or pnewnatic or hydraulic actuators, again depending upon the application to which the present invention is to be put. The appropriate choice of actuator will be apparent to those skilled in the art with due regard to the surrounding circumstances in which the present invention is to be employed.

Furthermore, any of the dimensions, materials and/or scale of the mechanism of the present invention may be varied at will without departing from the scope thereof as defined by the accompanying claims.

What is claimed is:

1. An apparatus for producing linear motion comprising:
   an elongate rod of circular cross-section arranged to be continuously rotated in a first direction about an elongate axis; and
   a carriage arranged to mounted on the rod so as to permit axial movement of the carriage along the length of the rod;
   wherein the carriage comprises:
   at least one first roller member arranged to contact the rod such that an axis of rotation of said roller member is at a first angle to the axis of rotation of the rod;
   said apparatus being characterized by further comprising:
   at least one first piezo-electric actuator means arranged to carry the first roller member for pressing the first roller member against the rod to cause rotation of the roller member, said piezo-electric actuator means comprising a first substantially flat resilient leg member and a second substantially flat resilient leg member, said first and said second leg members being connected by a substantially stiff bight portion, said leg members being arranged to lie substantially parallel with opposite surfaces of each leg member in mutual engagement along a substantial length of each leg member, other surfaces of each leg member being provided with piezo-electric layers arranged to deflect each leg member away from the other respective leg member;
   wherein the rotation of the roller member generates at least one axial vector in a first axial direction along said rod whereby to cause movement of the carriage along the rod in said first axial direction.

2. An apparatus according to claim 1, wherein the carriage further comprises:
   at least one other roller member arranged to contact the rod such that an axis of rotation of said other roller member is at a second angle to the axis of rotation of the rod; and
   at least one other piezo-electric actuator means arranged to carry the other roller member for pressing the other roller member against the rod to cause rotation of the other roller member;
   wherein the second angle is such that the rotation of the other roller member when pressed against the rod generates a second axial vector in a second axial direction.

3. An apparatus according to claim 2, wherein the carriage further comprises a plurality of said other roller members and a corresponding plurality of said other piezo-electric actuator means.

4. An apparatus according to claim 3, wherein each of said plurality of other roller members is arranged to rotate about an axis disposed at a different second angle to the axis of rotation of the rod than every other roller member.

5. An apparatus according to claim 3, wherein two or more of said plurality of other roller members are arranged to rotate about an axis disposed at the same second angle to the axis or rotation of the rod.

6. An apparatus according to claim 3, wherein each of said plurality of other piezo-electric actuator means are independently controllable to allow one or more of said other roller members to be pressed against said rod at any one time.

7. An apparatus according to claim 2, wherein said first roller member is arranged to contact the opposite side of said rod than said other roller member.

8. An apparatus according to claim 2, wherein the second angle of said other roller member and the first angle of said first roller member are identical whereby said second axial vector is identical in magnitude to said first axial vector.

9. An apparatus according to claim 2, wherein the second angle of said other roller member and the first angle of said first roller member are not identical, whereby said second axial vector is not identical in magnitude to said first axial vector.

10. An apparatus according to claim 2, wherein the carriage further comprises a plurality of said first roller members and a corresponding plurality of said first piezo-electric actuator means.

11. An apparatus according to claim 1, wherein the second angle of said other roller member and the first angle of said first roller member are identical whereby said second axial vector is identical in magnitude to said first axial vector.

12. An apparatus according to claim 1, wherein the second angle of said other roller member and the first angle of said first roller member are not identical, whereby said second axial vector is not identical in magnitude to said first axial vector.

13. An apparatus according to claim 1, wherein the operations of said first piezo-electric actuator means and said other piezo-electric actuator means are mutually exclusive whereby only one of said first roller member or said other roller member may be pressed against said rod at any one time.

14. An apparatus according to claim 1, wherein the carriage further comprises a plurality of said first roller members and a corresponding plurality of said first piezo-electric actuator means.

15. An apparatus according to claim 14, wherein each of said plurality of first roller members is arranged to rotate about an axis disposed at a different first angle to the axis of rotation of the rod than every other first roller member.

16. An apparatus according to claim 14 wherein two or more of said plurality of first roller members are arranged to rotate about an axis disposed at the same first angle to the axis of rotation of the rod.

17. An apparatus according to claim 14, wherein each of said plurality of first piezo-electric actuator means are independently controllable to allow one or more of said first roller members to be pressed against said rod at any one time.

18. An apparatus according to claim 17, wherein the carriage further comprises a plurality of said other roller members and a corresponding plurality of said other piezo-electric actuator means.

19. An apparatus according to claim 17, wherein the carriage further comprises a plurality of said other roller members and a corresponding plurality of said other piezo-electric actuator means.

20. An apparatus according to claim 1, wherein a free end of said first leg member is fixed to said carriage and a free end of said second leg member is arranged to carry at least one of said roller members.

* * * * *